United States Patent [19]

Egolf

[11] Patent Number: 5,696,969
[45] Date of Patent: Dec. 9, 1997

[54] PROCEDURE TO DETECT AND DISPERSE CONVOYS FOR QUEUED GATE SERVERS

[75] Inventor: David A. Egolf, Glendale, Ariz.

[73] Assignee: Bull HN Information Systems Inc., Billerica, Mass.

[21] Appl. No.: 619,445

[22] Filed: Mar. 19, 1996

[51] Int. Cl.⁶ .................................................... G06F 9/46
[52] U.S. Cl. .................... 395/674; 395/672; 395/673; 364/280; 364/281.3
[58] Field of Search ................................. 395/672, 673, 395/674; 364/280

[56] References Cited

U.S. PATENT DOCUMENTS

| | | | |
|---|---|---|---|
| 5,317,749 | 5/1994 | Dahlen | 395/726 |
| 5,333,319 | 7/1994 | Silen | 395/673 |
| 5,367,678 | 11/1994 | Lee et al. | 395/674 |

*Primary Examiner*—Lucien U. Toplu
*Assistant Examiner*—Majid A. Banankhah
*Attorney, Agent, or Firm*—J. S. Solakian; J. H. Phillips

[57] ABSTRACT

Convoys resulting from competing requests for a popular service are detected and dispersed by a scheduling procedure. When a request first enters the procedure, a determination is made as to whether the procedure is currently in the convoy disperse mode. If not, availability of the service is checked, and if it is available, the request is serviced. If the service is not available, a delay is instituted, and availability of the service is checked again. If it is still not available, a wait-for-service count is checked to determine if it exceeds a predetermined value. If not, the present request is sent to a queued wait. If so, the convoy disperse flag is set true, and the request is sent to the queued wait. If the convoy disperse flag was already true when the request was received into the procedure, a different path is taken in which a loop is entered which involves temporarily relinquishing the processor. This loop can be passed through a predetermined number of times with the service availability checked each pass. If the service becomes available, the convoy disperse flag is set false, and the request is serviced. If the service does not become available after the predetermined number of passes through the loop, the request is sent to the queued wait.

10 Claims, 4 Drawing Sheets

PROCEDURE TO DETECT AND DISPERSE CONVOYS FOR QUEUED GATE SERVERS

FIELD OF THE INVENTION

This invention relates to the art of information processing and, more particularly, to a method for detecting and dispersing convoys for queued gate servers in a multiprocessing system.

BACKGROUND OF THE INVENTION

In large data processing systems, processing can be characterized as a collection of processes executing job and transaction schedules. These schedules, or job steps, alternate between local processing and requests for services; e.g., requests for file allocations. Many of these services provide access to resources shared among processes. In order to maintain the integrity of the shared resources, these requests must be gated so that only one process at a time is allowed access. This invention deals with a procedure which gates access to these shared resources.

In a multiprocessing system, it is necessary to optimize the utilization of the processor(s) by relinquishing control at those times when no useful work can be performed; e.g., when blocked waiting for a gate. This allows other processes to proceed with the execution of their transaction schedules. On the other hand, there is a performance cost associated with changing a processor from one process to another. Therefore, if there is an expectation that a blockage is temporary, there may be a net gain in system utilization by performing a wasteful processor busy wait in order to avoid the process switch overhead.

The simplest approach to provide shared resource gating is to poll the gate while holding the processor. This approach works reliably if the service time is short so that the gate may be expected to become available with a minimum of wasted delay time. It is not practical, however, if the service time is long. For example, if an input/output operation (I/O) is sometimes required in order to complete the gated service, then the waiting process would waste the processor waiting for the I/O to complete. Additionally, on a single processor system, it can be appreciated that a gate collision would result in a deadlock since the process attempting to complete the service would be unable to acquire the single processor being held by the waiting process.

The next simplest approach for resolving a gating conflict is to relinquish control of the processor for a fixed amount of time. After the time is expired, the processor is acquired again, and the availability of the gate is retested. The first difficulty with this approach is establishing the proper setting of the time. If it is set too large, then the effective service time will be long and the responsiveness of the server will suffer. If it is set too small, then many poll attempts will find that the service is not yet complete, and the time to acquire the process will have been wasted. An additional problem occurs for large systems. As the number of processes competing for the service gets large, the number of poll attempts per service can grow without bound. In such situations any particular process can become starved for service as the variability of the service time grows to huge levels.

The next level of complexity on approaches to avoid the starvation problem and to limit the overhead of waiting is to provide a FIFO queue for waiting processes. Only one process is allowed to poll the queue. Processes arriving at the server add themselves to the queue if the service is not immediately available. A subtle distinction implemented by most systems is to not poll, but simply notify the first waiting process as soon as the server becomes available.

The difficulty with this last mentioned method of scheduling is the creation of "convoys", i.e., high traffic locks with a standing queue of waiting processes. When a particular server tends to be visited multiple times during transaction schedules, then there is a high probability that the process in service will exit the server and attempt to request the same server almost immediately. Under a low load condition, where there is no queue of waiters, the second request would be immediately granted. When there are no gate collisions, several processes may obtain service rapidly for the cost of shutting and opening the gate. However, if there are processes queued for the server, then the process exiting service will have to join the queue. If any of the processes in the queue at that time need two service requests in a row, then they will queue up behind the first mentioned process. The existence of processes in the queue can become a stable state which exists even after the overload condition which caused the initial queuing is gone.

The log/journal lock in a database system, for example, is a frequent source of convoys. Each update generates a log record to be inserted at the end of the log. Such inserts can occur frequently in a single transaction.

These convoys are stable. Once formed, convoys can last forever, and they are much worse in multiprocessor environments. The effective service time of the server is lengthened by the time it takes to schedule or dispatch a processor. Process scheduling time can be an order of magnitude longer than the original expected service time.

An added complexity to the problem is that a server can indeed become saturated. There may be a legitimate standing queue for a server which cannot keep up with its requests. A solution to the convoy problem should exhibit appropriate behavior for the case of a saturated server.

Consideration has been given in the prior art to addressing the convoys problem, and these efforts have been successful to some degree. The prior art approach to mitigating the convoy problem has three parts:

(1) Reduce the effective service time during a convoy by expediting the time it takes to get the next process in the queue into execution. For low levels of load and small numbers of processes and processors, this approach works well.

(2) Do not allow processes holding hotspot locks to be preempted (this is not simple in most systems). It also is not tenable if the service employs synchronous I/O; e.g., paging I/O.

(3) Do not schedule hotspot locks on a FIFO basis; rather, wake up all waiting processes and let them race for the lock. However, as mentioned previously, this type of waiting is subject to service starvation. It also wastes system resources in the ease of a saturated server.

OBJECTS OF THE INVENTION

It is therefore a broad object of this invention to improve the performance of a data processing system which incorporates a server feature for handling a repetitive task for the system.

It is a more specific object of this invention to provide a server gating procedure which detects the possible existence of convoys and allows the queue to disperse the formation of convoys while not destroying the basic FIFO nature of the queue.

SUMMARY OF THE INVENTION

Briefly, these and other objects of the invention are achieved by sending each request for service through a procedure which handles each request by first determining if the queue is currently in a convoy disperse state as indicated by a convoy disperse flag being true. If not, availability of the service is checked, and if it is available, the request is serviced. If the service is not available, a delay is instituted, and availability of the service is checked again. If it is still not available, a wait-for-service count is checked to determine if it exceeds a predetermined value. If not, the present request is sent to a queued wait. If so, the convoy disperse flag is set true, and the request is sent to the queued wait.

However, if the convoy disperse flag was already true when the request was received into the procedure, a different path is taken in which a loop is entered which involves temporarily relinquishing the processor. This loop can be passed through a predetermined number of times with the service availability checked after each wait. If the service becomes available, the convoy disperse flag is set false, and the request is serviced. If the service does not become available after the predetermined number of passes through the loop, the request is sent to the queued wait. It is assumed that the server is actually saturated.

DESCRIPTION OF THE DRAWING

The subject matter of the invention is particularly pointed out and distinctly claimed in the concluding potion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

In the discussion below, the following pertinent semaphore variables are used:

| NAME | TYPE | MEANING |
|---|---|---|
| CONVOY DISPERSE | Boolean | Set TRUE only while a possible convoy has been detected. |
| SERVER AVAILABLE | Boolean | Set TRUE while no process is in service |
| WAIT FOR SERVICE | Counter | Counts number of successive requests which result in a wait. |
| WAITER COUNT | Counter | Counts number of processes waiting in queue. |
| MAXLOOP | Counter | Controls number of relinquishes performed by a single requesting process while waiting for a convoy to disperse. (This variable is process local.) |
| CONVOY DETECT COUNT | Counter | Instrumentation |
| SUCCESS COUNT | Counter | Instrumentation |
| FAILURE COUNT | Counter | Instrumentation |

Figure 1:
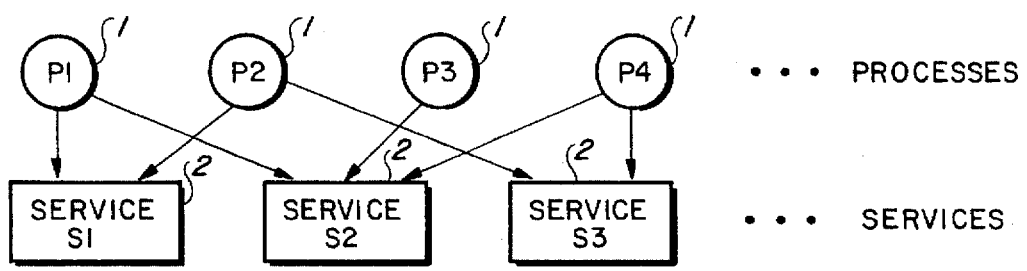
FIG. 1 is a generalized block diagram of an exemplary data processing system in which a collection of processes employ various services during the execution of a transaction or job schedule.

Attention is first directed to FIG. 1 which illustrates an exemplary multiprocessing, multiprocessor environment for practicing the subject gating method (although it will be understood that a single processor performing multiple processes is an equally eligible environment for practicing the invention). In the example, a collection of numerous processes 1 execute on any of the processors of a symmetric multiprocessing (SMP) system. At various times of their schedules, they employ the various depicted services 2 by calling the service procedures. Some of these services will be managing shared resources which require gating. Merely by way of example, it may be a task of Service S3 to maintain a journal or log which tracks and records a multitude of transactions performed by part or all of the large scale data processing system shown in the example of FIG. 1.

Figure 2:
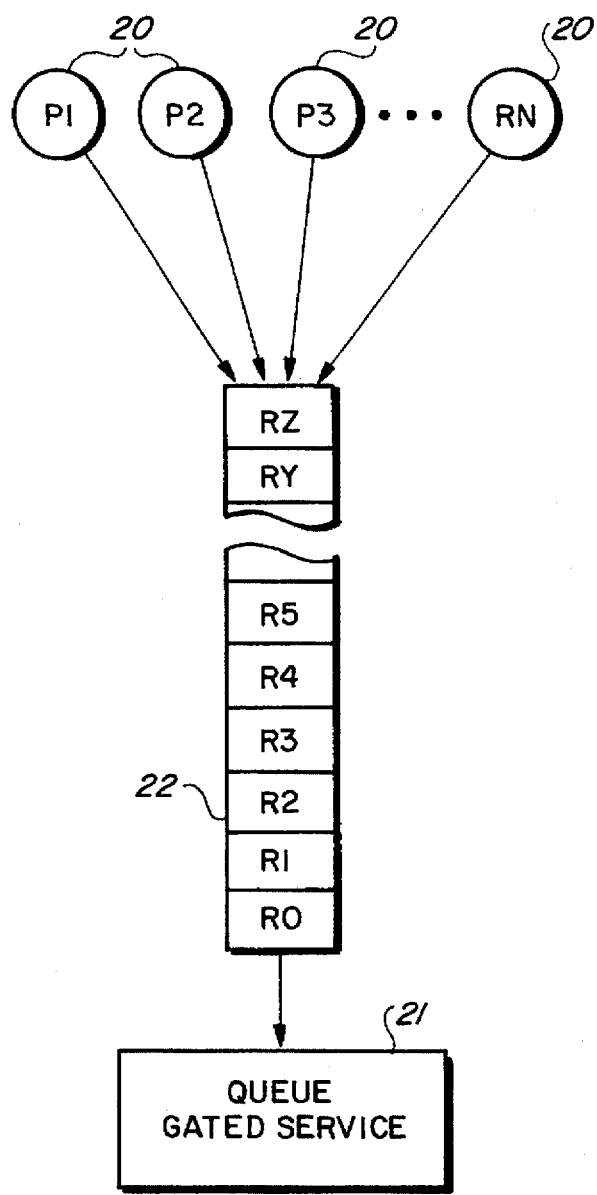
FIG. 2 depicts multiple processes employing a queue gated service.
Figure 3C:
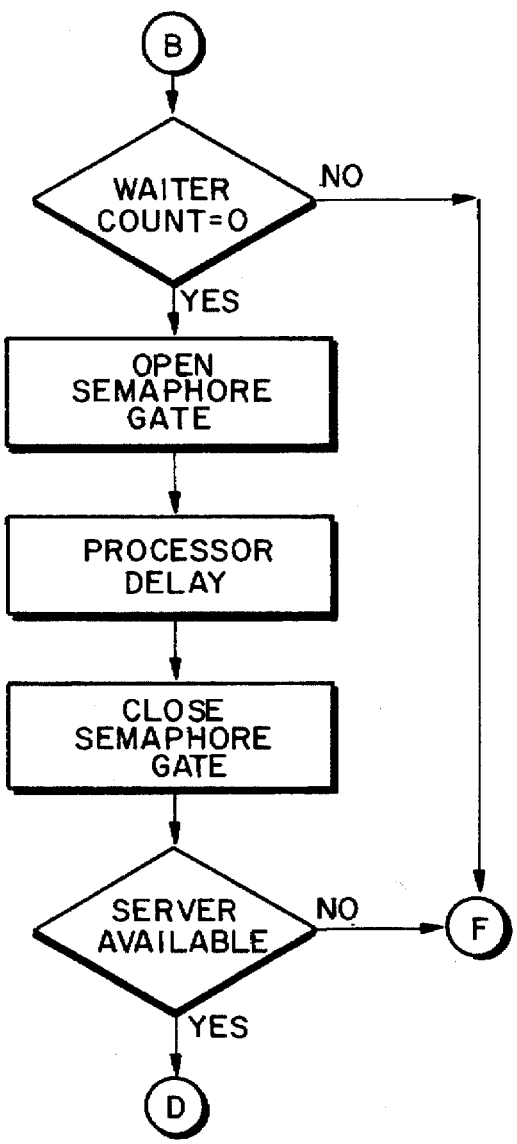

Referring to FIG. 2, it will be seen that the typical environment for the practice of the subject invention involves a plurality of processes 20, $P_1$-$P_N$, all requesting repetitive access to a queue gated service 21 such that a queue 22 is established. As previously discussed, a simple FIFO queue will result in the formation of stable convoys when the queue gated service 21 is under constant and repetitive requests from the several processes 20.

Figure 3:
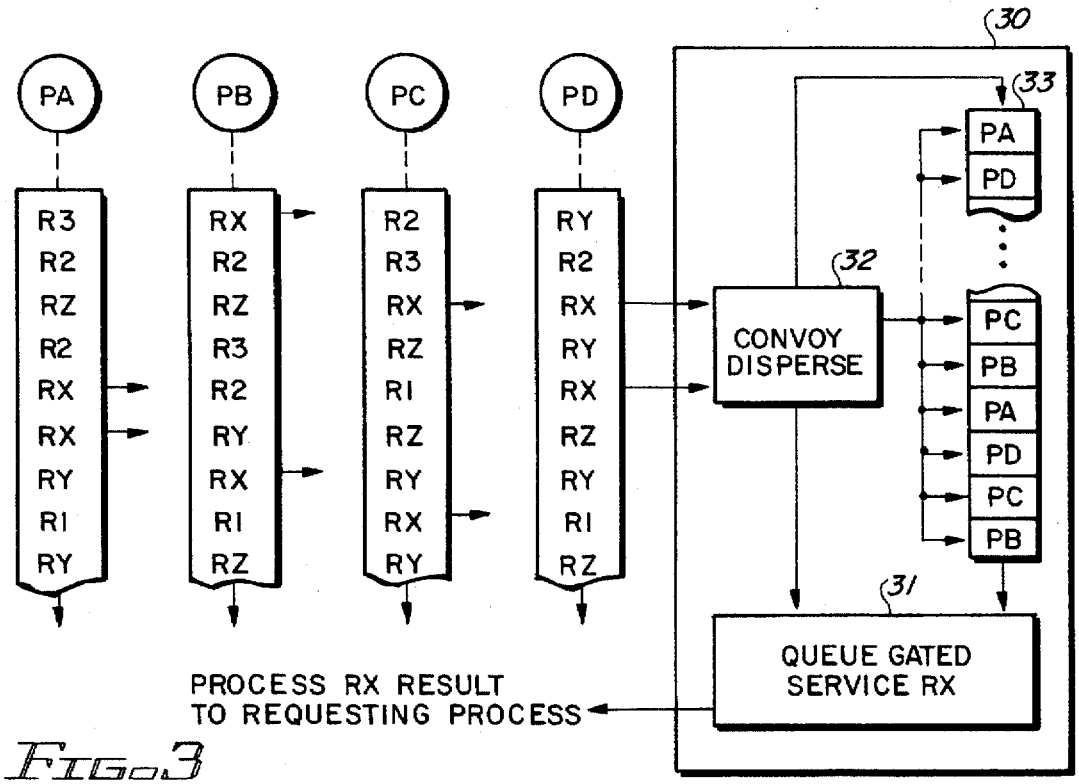
FIG. 3 is a more detailed data flow diagram illustrating the interaction between a plurality of processes in a data processing system requesting access to a task, RX. Requests for service RX occur frequently and randomly in each of these processes transaction schedule. The diagram depicts a convoy dispersal mechanism controlling the queue.

FIG. 3 illustrates this condition in more detail. Assume that, in the running of processes PA, PB, PC and PD, requests are made by each to other processes/services and that queue gated service 30, designated as service RX 31 in the example, is often and repetitively requested by each of the processes PA, PB, PC and PD. According to the present invention, the requests for service RX 31 are scheduled in accordance with a convoy disperse technique, represented by block 32, to maintain a queue 33 which is not permitted to establish stable convoys.

Figure 4:
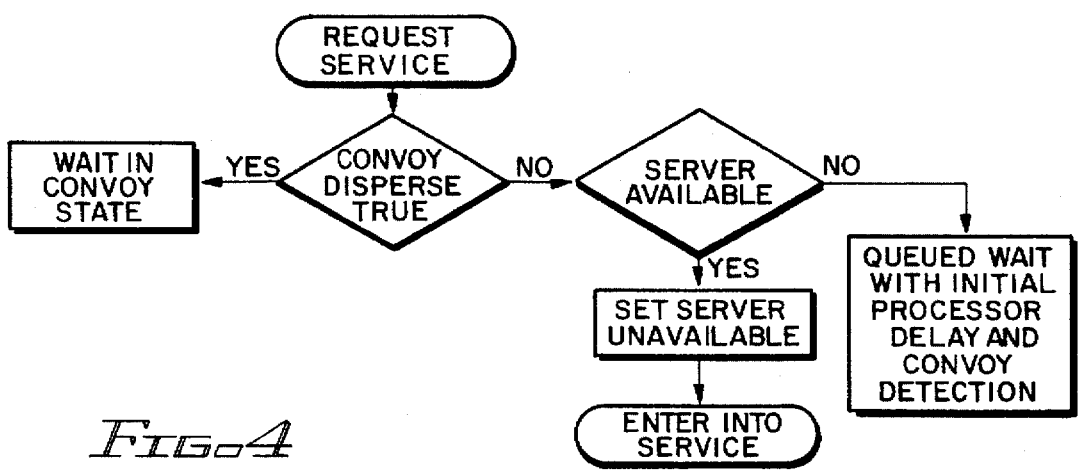
FIG. 4 is a high level flow chart of the subject scheduling method.

Referring now to FIG. 4 (as well as FIG. 3), the high level flowchart shown illustrates generally how the subject invention is employed to mitigate the convoy problem. Upon receiving a request for service for service RX 31 from, say, process A, the convoy disperse procedure 32 first determines if a convoy disperse is presently in effect. If not, the immediate availability of service RX 31 is determined. If it is available, a server unavailable flag is set, and the present request is handled. If the service is not immediately available, a queued wait with processor delay and convoy detection subprocedure is entered. As will be explained more fully below, this subprocedure may involve either routine subsequent handling of the new request, or an imminent convoy development may be detected which brings about more elaborate scheduling in accordance with the invention.

If, when the new request is received, the need for the convoy disperse procedure has already been sensed and established, the new request immediately enters the more elaborate scheduling course in accordance with the invention.

Figure 5A:
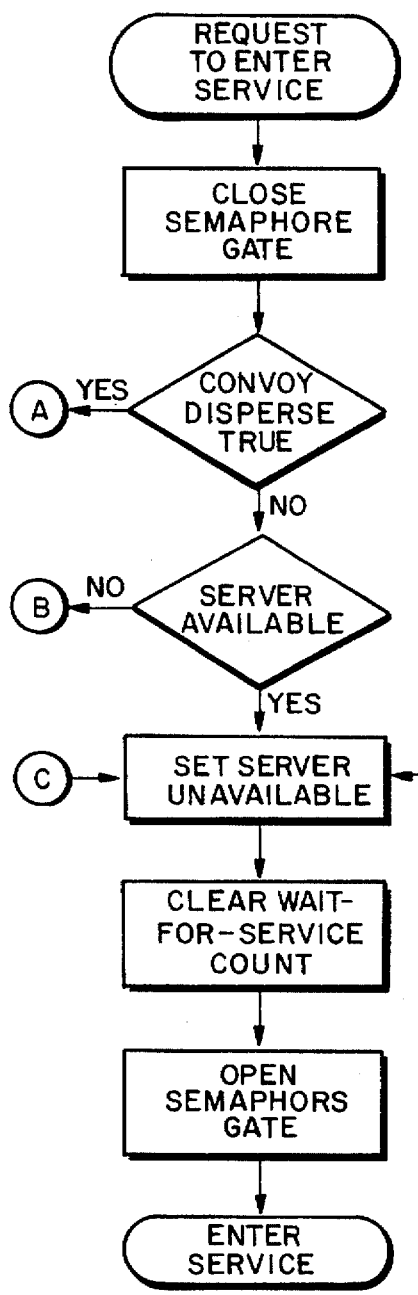
FIG. 5, constituting FIGS. 5A, 5B, 5C and 5D taken together, is a detailed flow chart of the subject gating procedure.
Figure 5B:
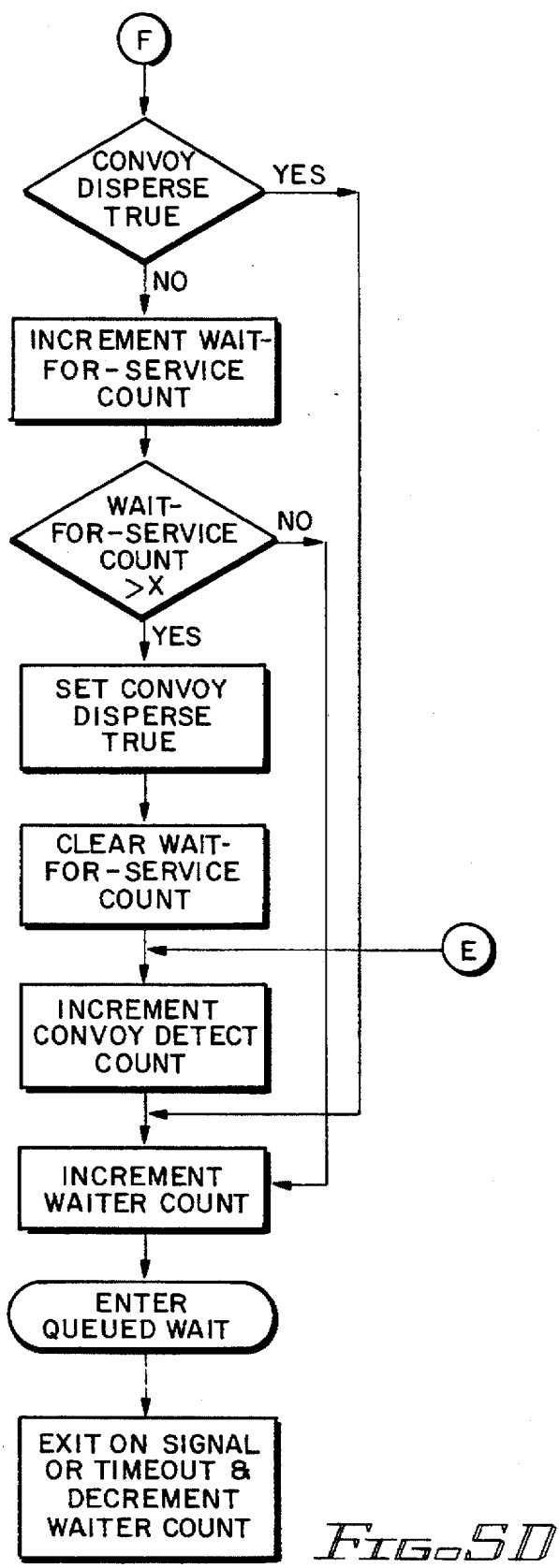
Figure 5B:
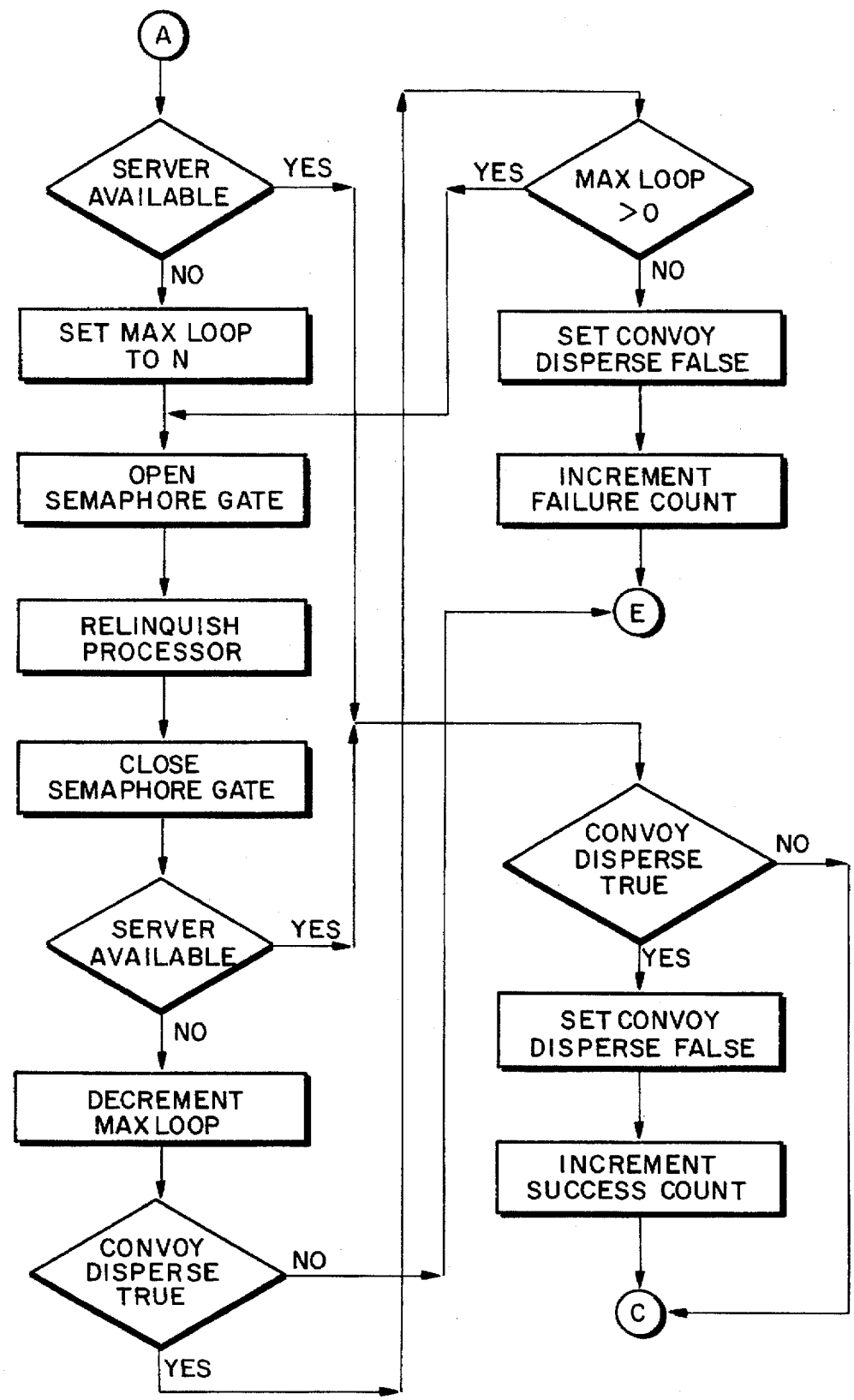

The complete convoy detect and disperse procedure is shown in the flowchart of FIG. 5, constituting FIGS. 5A, 5B, 5C and 5D taken together and interconnected with conventional flow chart links A, B, C, D, E and F.

In FIG. 5A, it will be seen that a new request for service first results in closing a semaphore spin gate; i.e., this new request will begin to be handled before any subsequent new request can "get at" the procedure represented by the block 32 in FIG. 3. (It will be understood as the discussion proceeds that more than one request can be actively processed simultaneously, successive admittance to the procedure being under control of the semaphore spin gate.) The implementation must preclude the interruption of the process while the semaphore spin gate is held; i.e., it is presumed that the semaphore gating service itself is done expeditiously.

Continuing with the process flow shown in FIG. 5A, if it has been previously determined that it is necessary to temporarily invoke the convoy disperse procedure (such that a "convoy disperse" flag has been set true), the request is sent to the link A in FIG. 5B. Assuming for the moment that the converse disperse flag is false, an inquiry is made to determine if the process (service RX in the example) is immediately available. If not, the request is sent to the link B in FIG. 5C. Assuming for the moment that the service RX is immediately available, a "server unavailable" flag is set to indicate that the service RX is in use. (It will be noted that this step can also be entered from links C and D from FIGS. 5B and 5C, respectively.) Then, a "wait-for-service" count (whose origin will be described below) is cleared, the semaphore is opened to admit new requests to the procedure, and the present request is serviced.

However, as noted, if the convoy disperse flag is not true, but service RX is in use, the path through link B is taken. Thus, referring to FIG. 5C, a determination is made as to whether the waiter count is 0. If not, a link F to FIG. 5D is made. Assuming for the moment that the waiter count is zero, the semaphore gate is opened, and a processor busy delay takes place. (There are no queued waiters, and the server may become available quickly.) After the processor delay has timed out, the semaphore gate is closed, and an inquiry is made to determine if the service is now available. If the service is not yet available, the link F to FIG. 5D is made. However, if the service has become available, link D to FIG. 5A is made, and the request is serviced as previously described.

Consider now the operation starting at link F in FIG. 5D. An inquiry is made as to whether the convoy disperse flag is true. (It will be observed that this flag could have been changed—by another request ahead of the request being tracked in this discussion—after the initial inquiry upon entering the procedure as shown in FIG. 5A.) If it is, the waiter count is incremented, and the request is sent to a queue wait, a FIFO queue (corresponding to the queue 33 in FIG. 3) from which the service will select the most senior entry for serving next. The process will exit the queue if it is signaled or a timer expires. At that time, the waiter count will be decremented.

If the convoy disperse flag is not true, the wait-for-service count is incremented, and an inquiry is made as to whether the wait-for-service count is greater than a value X. (The value X is predetermined through experience in accordance with the characteristics of the given server and its propensity for establishing convoys. A typical value X for a server having a strong propensity for establishing convoys is in the range 50 to 100. Larger values of X will result in attempting to disperse convoys less frequently. This would be less disruptive for a server which was actually saturated.) If the wait-for-service count is not greater than X, it is incremented again, and the request is placed in the queued wait.

However, if the wait-for-service count is greater than X (which indicates that a convoy has formed—or is forming—and must be dispersed), the convoy disperse flag is set true, the wait-for-service count is cleared, the convoy detect count (a statistic useful in monitoring system performance) is incremented, the waiter count is incremented, and the request is placed in the queued wait.

Returning to FIG. 5A, if the convoy disperse flag if found to be true when the request enters the procedure, link A to FIG. 5B is taken. Thus, referring to FIG. 5B, an inquiry is made to determine if service RX is available. If so, an inquiry is made as to whether the convoy disperse flag is still true. If not, link C is taken to FIG. 5A, and the request is handled as previously described. If the convoy disperse flag is set true, it is set false, the success count (another statistic of interest to system performance, and of particular use in "tuning" the procedure such as by adjusting the values of X and N) is incremented and link C is taken as before.

If the service RX is not available at the beginning of the procedure at link A, a variable "maxloop" is set to N. (the variable N is a value, which depends on the mount of time which should be allowed for a convoy to disperse. The range for N is set so that the time will be some multiple of the expected service time.) The value of maxloop determines the number of times the procedure "balks" at considering service of a given request. A typical value for maxloop is within the range 20 to 100.

Next, the semaphore gate is opened and the processor is relinquished (to effect the "balk"), the semaphore gate closed and an inquiry of the availability of the server is again made. The effectiveness and consistency of setting N is enhanced if a "timed" delay can be invoked on the system rather than just a processor relinquish.

If the server is now available, indicating that the convoy has been dispersed, one of the alternative paths to link C is taken as before. If the server is still not available, maxloop is decremented, and a determination is made as to whether the convoy disperse flag is still true. If not, the procedure is directed to link E in FIG. 5D for an increment of the waiter count and entry of the request into the queued wait.

However, if the convoy disperse flag is true, indicating that there is still congestion, the semaphore gate is opened, the processor is relinquished, the semaphore gate closed and the server availability checked. Assuming that the server is still unavailable, the maxloop is again decremented, the convoy disperse flag checked and if true, the value of maxloop is checked. Assuming that maxloop has been decremented to 0, the convoy disperse flag is set false, the failure count is incremented and link E is made to FIG. 5D to increment the waiter count and enter the process into queued wait. This last disposition of the process is an indication that the convoy disperse was not successful under the conditions prevalent at the time the process was allowed to enter the queued wait, a fact which is reflected in the failure count.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A convoy dispersing procedure for scheduling requests from multiple sources for use of a service comprising the steps of:
   A) receiving a request for use of the service;
   B) determining if a convoy disperse flag is true;
   C) if the convoy disperse flag is not true:
      1) determining if the service is available to serve the request;
      2) if the service is available, setting a wait-for-service count to a first predetermined wait-for-service value and serving the request to complete the processing of the request;
      3) if the service is not available, testing a waiter count to determine if it is the first predetermined waiter value;
      4) if the waiter count is the first predetermined waiter value:
         a) instituting a predetermined delay;
         b) after the predetermined delay, determining if the service is available to serve the request;
         c) if the service is available, setting the wait-for-service count to the first predetermined wait-for-service value and serving the request to complete the processing of the request; and
         d) if the service is not available, going to step C)5)a);
      5) if the waiter count is not the first predetermined waiter value:
         a) determining if the convoy disperse flag has changed to true;
         b) if the convoy disperse flag is now true, incrementing the waiter count and sending the request to a queue for subsequent service, thereby concluding processing of the request;
         c) if the convoy disperse flag is not true:
            i) incrementing the wait-for-service count;
            ii) determining if the wait-for-service count is greater than a second predetermined wait-for-service value;
            iii) if the wait-for-service count is not greater than the second predetermined wait-for-service value, incrementing the waiter count and sending the request to the queue for subsequent service, thereby concluding processing of the request;
            iv) if the wait-for-service count is greater than the second predetermined wait-for-service value, setting the convoy disperse flag true, setting the wait-for-service count to the first predetermined wait-for-service value, incrementing the waiter count and sending the request to the queue for subsequent service, thereby concluding processing of the request;
   D) if the convoy disperse flag is true:
      1) determining if the service is available to serve the request;
      2) if the service is available:
         a) determining if the convoy disperse flag is true;
         b) if the convoy disperse flag is true, setting the convoy disperse flag false, setting the wait-for-service count to the first predetermined wait-for-service value and serving the request to complete the processing of the request;
         c) if the convoy disperse flag is not now true, setting the wait-for-service count to the first predetermined wait-for-service value and serving the request to complete the processing of the request;
      3) if the service is not available:
         a) setting a maxloop count to a first predetermined maxloop value;
         b) determining if the service is now available;
         c) if the service is now available:
            i) determining if the convoy disperse flag is now true;
            ii) if the convoy disperse flag is true, setting the convoy disperse flag false, setting the wait-for-service count to the first predetermined wait-for-service value and serving the request to complete the processing of the request;
            iii) if the convoy disperse flag is not now true, setting the wait-for-service count to the first predetermined wait-for-service value and serving the request to complete the processing of the request;
         d) if the service is not now available:
            i) decrementing the maxloop count and determining if the convoy disperse flag is still true;
            ii) if the convoy disperse flag is not now still true, incrementing the waiter count and sending the request to a queue for subsequent service, thereby concluding processing of the request;
            iii) if the convoy disperse flag is still true, determining if the maxloop count is greater than a second predetermined maxloop value;
            iv) if the maxloop count is not greater than the second predetermined maxloop value, setting the convoy disperse flag false, waiter count and sending the request to a queue for subsequent service, thereby concluding processing of the request; and
            v) if the maxloop count is greater than the second predetermined value, returning to step D)3)b).

2. The procedure of claim 1 in which the first predetermined wait-for-service value for the wait-for-service count and the second predetermined maxloop value for the maxloop count are each 0.

3. The procedure of claim 2 in which the first predetermined maxloop value for the maxloop count is within the range 20 to 100.

4. A convoy dispersing procedure for scheduling requests from multiple sources for use of a service comprising the steps of:
   A) if a semaphore is open, admitting for processing a request for use of the service and closing the semaphore;
   B) determining if a convoy disperse flag is true;
   C) if the convoy disperse flag is not true:
      1) determining if the service is available to serve the request;
      2) if the service is available, assuming ownership of the server, setting a wait-for-service count to a first predetermined wait-for-service value, opening the semaphore and serving the request to complete the processing of the request;
      3) if the service is not available, testing a waiter count to determine if it is the first predetermined waiter value;
      4) if the waiter count is the first predetermined waiter value:
         a) opening the semaphore and instituting a predetermined delay;
         b) after the predetermined delay, closing the semaphore and determining if the service is available to serve the request;

c) if the service is available, assuming ownership of the service, setting the wait-for-service count to the first predetermined wait-for-service value, opening the semaphore and serving the request to complete the processing of the request; and d) if the service is not available, going to step C)5)a);

5) if the waiter count is not the first predetermined waiter value:

a) determining if the convoy disperse flag has changed to true;

b) if the convoy disperse flag is now true, incrementing the waiter count and sending the request to a queue for subsequent service, thereby concluding processing of the request;

c) if the convoy disperse flag is not true:

i) incrementing the wait-for-service count;

ii) determining if the wait-for-service count is greater than a second predetermined wait-for-service value;

iii) if the wait-for-service count is not greater than the second predetermined wait-for-service value, incrementing the waiter count and sending the request to the queue for subsequent service, thereby concluding processing of the request;

iv) if the wait-for-service count is greater than the second predetermined wait-for-service value, setting the convoy disperse flag true, setting the wait-for-service count to the first predetermined wait-for-service value, incrementing the waiter count and sending the request to the queue for subsequent service, thereby concluding processing of the request;

D) if the convoy disperse flag is true:

1) determining if the service is available to serve the request;

2) if the service is available:

a) determining if the convoy disperse flag is true;

b) if the convoy disperse flag is true, setting the convoy disperse flag false, setting the wait-for-service count to the first predetermined wait-for-service value and serving the request to complete the processing of the request;

c) if the convoy disperse flag is not now true, setting the wait-for-service count to the first predetermined wait-for-service value and serving the request to complete the processing of the request;

3) if the service is not available:

a) setting a maxloop count to a first predetermined maxloop value;

b) opening the semaphore gate, relinquishing ownership of the service and closing the semaphore gate;

determining if the service is now available;

d) if the service is now available:

i) determining if the convoy disperse flag is now true;

ii) if the convoy disperse flag is true, setting the convoy disperse flag false, setting the wait-for-service count to the first predetermined wait-for-service value and serving the request to complete the processing of the request;

iii) if the convoy disperse flag is not now true, setting the wait-for-service count to the first predetermined wait-for-service value and serving the request to complete the processing of the request;

e) if the service is not now available:

i) decrementing the maxloop count and determining if the convoy disperse flag is still true;

ii) if the convoy disperse flag is not now still true, incrementing the waiter count and sending the request to a queue for subsequent service, thereby concluding processing of the request;

iii) if the convoy disperse flag is still true, determining if the maxloop count is greater than a second predetermined maxloop value;

iv) if the maxloop count is not greater than the second predetermined maxloop value, setting the convoy disperse flag false, waiter count and sending the request to a queue for subsequent service, thereby concluding processing of the request; and v) if the maxloop count is greater than the second predetermined value, returning to step D)3)b).

5. The procedure of claim 4 in which the first predetermined wait-for-service value for the wait-for-service count and the second predetermined maxloop value for the maxloop count are each 0.

6. The procedure of claim 5 in which the first predetermined maxloop value for the maxloop count is within the range 20 to 100.

7. A convoy dispersing procedure for scheduling requests from multiple sources for use of a service comprising the steps of:

A) if a semaphore is open, admitting for processing a request for use of the service and closing the semaphore;

B) determining if a convoy disperse flag is true;

C) if the convoy disperse flag is not true:

1) determining if the service is available to serve the request;

2) if the service is available, assuming ownership of the server, setting a wait-for-service count to a first predetermined wait-for-service value, opening the semaphore and serving the request to complete the processing of the request;

3) if the service is not available, testing a waiter count to determine if it is the first predetermined waiter value;

4) if the waiter count is the first predetermined waiter value:

a) opening the semaphore and instituting a predetermined delay;

b) after the predetermined delay, dosing the semaphore and determining if the service is available to serve the request;

c) if the service is available, assuming ownership of the service, setting the wait-for-service count to the first predetermined wait-for-service value, opening the semaphore and serving the request to complete the processing of the request; and d) if the service is not available, going to step C)5)a);

5) if the waiter count is not the first predetermined waiter value:

a) determining if the convoy disperse flag has changed to true;

b) if the convoy disperse flag is now true, incrementing the waiter count and sending the request to a queue for subsequent service, thereby concluding processing of the request;

c) if the convoy disperse flag is not true:

i) incrementing the wait-for-service count;

ii) determining if the wait-for-service count is greater than a second predetermined wait-for-service value;

iii) if the wait-for-service count is not greater than the second predetermined wait-for-service value, incrementing the waiter count and sending the request to the queue for subsequent service, thereby concluding processing of the request;

iv) if the wait-for-service count is greater than the second predetermined wait-for-service value, setting the convoy disperse flag true, setting the wait-for-service count to the first predetermined wait-for-service value, incrementing a convoy detect count, incrementing the waiter count and sending the request to the queue for subsequent service, thereby concluding processing of the request;

D) if the convoy disperse flag is true:
1) determining if the service is available to serve the request;
2) if the service is available:
  a) determining if the convoy disperse flag is true;
  b) if the convoy disperse flag is true, setting the convoy disperse flag false, incrementing a success count, setting the wait-for-service count to the first predetermined wait-for-service value and serving the request to complete the processing of the request;
  c) if the convoy disperse flag is not now true, setting the wait-for-service count to the first predetermined wait-for-service value and serving the request to complete the processing of the request;
3) if the service is not available:
  a) setting a maxloop count to a first predetermined maxloop value;
  b) opening the semaphore gate, relinquishing ownership of the service and closing the semaphore gate;
determining if the service is now available;
  d) if the service is now available:
    i) determining if the convoy disperse flag is now
    ii) if the convoy disperse flag is true, setting the convoy disperse flag false, setting the wait-for-service count to the first predetermined wait-for-service value and serving the request to complete the processing of the request;
    iii) if the convoy disperse flag is not now true, setting the wait-for-service count to the first predetermined wait-for-service value and serving the request to complete the processing of the request;
  e) if the service is not now available:
    i) decrementing the maxloop count and determining if the convoy disperse flag is still true;
    ii) if the convoy disperse flag is not now still true, incrementing the waiter count and sending the request to a queue for subsequent service, thereby concluding processing of the request;
    iii) if the convoy disperse flag is still true, determining if the maxloop count is greater than a second predetermined maxloop value;
    iv) if the maxloop count is not greater than the second predetermined maxloop value, setting the convoy disperse flag false, incrementing a failure count, incrementing the waiter count and sending the request to a queue for subsequent service, thereby concluding processing of the request; and
    v) if the maxloop count is greater than the second predetermined value, returning to step D)3)b).

8. The procedure of claim 7 in which the first predetermined wait-for-service value for the wait-for-service count and the second predetermined maxloop value for the maxloop count are each 0.

9. The procedure of claim 8 in which the first predetermined maxloop value for the maxloop count is within the range 20 to 100.

10. A convoy dispersing procedure for scheduling requests from multiple sources for use of a service comprising the steps of:

A) when a request is received, determine if the procedure is in a convoy disperse mode;
B) if the procedure is not in the convoy disperse mode:
1) check the availability of the service;
  a) if the service is available, service the request;
  b) if the service is not available:
    i) institute a delay;
    ii) when the delay has timed out, check again if the service is available and, is the service is available, service the request;
    iii) if the service is still not available, check a wait-for-service account to see if it exceeds a predetermined value;
    iv) if the wait-for-service value does not exceed the predetermined value, send the request to a queued wait;
    v) if the wait-for-service exceeds the predetermined value, set the convoy disperse mode true and send the request to the queued wait; and
C) if the procedure is in the convoy disperse mode:
1) temporarily release the processor;
2) check the availability of the service;
  a) if the service is available, set the convoy disperse mode false and service the request;
  b) if the service is not available, determine if the procedure has passed through step C)2) a predetermined number of times;
  c) if the procedure has passed through step C)2) the predetermined number of times, send the request to the queued wait; and
  d) if the procedure has not passed through step C)2) the predetermined number of times, loop to step C)2).

* * * * *